United States Patent
Chaudhari et al.

(10) Patent No.: US 7,039,951 B1
(45) Date of Patent: May 2, 2006

(54) SYSTEM AND METHOD FOR CONFIDENCE BASED INCREMENTAL ACCESS AUTHENTICATION

(75) Inventors: Upendra V. Chaudhari, Elmsford, NY (US); Ganesh N. Ramaswamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 09/588,521

(22) Filed: Jun. 6, 2000

(51) Int. Cl.
*H04L 9/32* (2006.01)
*G06F 7/04* (2006.01)

(52) U.S. Cl. .............................. 726/7; 726/4; 340/5.84; 379/88.02; 382/115

(58) Field of Classification Search ........ 713/182–186, 713/200–202, 155; 704/246; 379/88.02; 340/5.1, 5.82, 5.84, 5.52; 382/115
See application file for complete search history.

(56) References Cited

U.S. PATENT DOCUMENTS

| | | | | |
|---|---|---|---|---|
| 5,897,616 | A * | 4/1999 | Kanevsky et al. | 704/246 |
| 6,088,428 | A * | 7/2000 | Trandal et al. | 379/88.02 |
| 6,105,132 | A * | 8/2000 | Fritch et al. | 713/167 |
| 6,311,272 | B1 * | 10/2001 | Gressel | 713/186 |
| 6,321,339 | B1 * | 11/2001 | French et al. | 713/201 |
| 6,370,648 | B1 * | 4/2002 | Diep | 713/201 |
| 2003/0154406 | A1 * | 8/2003 | Honarvar et al. | 713/201 |

FOREIGN PATENT DOCUMENTS

| | | |
|---|---|---|
| KR | 9-120293 | 5/1997 |
| KR | 9-198086 | 7/1997 |
| KR | 2000-81894 | 3/2000 |
| WO | WO 98/57247 | 12/1998 |
| WO | WO 99/24938 | 3/1999 |
| WO | WO 00/20962 | 4/2000 |

OTHER PUBLICATIONS

Patent Abstracts of Japan for Publication No. 09-198086.
Patent Abstracts of Japan for Publication No. 09-120293.
Patent Abstracts of Japan for Publication No. 2000-081894.
Tomoko Matsui, *Studies on Robust Speaker Recognition System*, ITE Technical Report, vol. 21, No. 42, pp. 13-18, Jul. 1997.

* cited by examiner

*Primary Examiner*—Christopher Revak
(74) *Attorney, Agent, or Firm*—Frank V. DeRosa; F. Chau & Associates, LLC

(57) ABSTRACT

A system and method for providing continuous confidence-based authentication. The present invention may be implemented in an incremental access authentication system for controlling access to secured data having various levels of security. During the course of a conversational session between user and machine, a confidence-based authentication system according to the present invention will periodically analyze the input speech of a user interacting with the system to compute a "confidence measure" for the validity of an original identity claim i provided by the user at the commencement of the dialog session. The "confidence measure" computation process according to the present invention is seamlessly integrated into the incremental access authentication system so that the system can tailor its interaction with the user based on its confidence in the original identity claim.

28 Claims, 6 Drawing Sheets

US 7,039,951 B1

SYSTEM AND METHOD FOR CONFIDENCE BASED INCREMENTAL ACCESS AUTHENTICATION

BACKGROUND

1. Technical Field

The present invention relates generally to a system and method for providing user authentication and, in particular, to a system and method for providing confidence-based authentication in an incremental access authentication system, wherein a confidence score is periodically computed during a dialog session between user and machine to check the confidence level in the validity of an original identity claim.

2. Description of Related Art

The computing world is evolving towards an era where billions of interconnected pervasive clients will communicate with each other and with powerful information servers. Indeed, this millennium will be characterized by the availability of multiple information devices that make ubiquitous information access an accepted fact of life. Due to the increase in human-machine interaction that will result from the pervasive use of such information devices, users will demand that such interaction be natural and simple as if they were having a conversation with another individual.

One factor in making the human-machine interaction more natural and effective is the ability of the machine to accurately and efficiently verify an identity claim of the user based on speech interactions. Conventional techniques well known to those skilled in the art for authenticating an individual based on his/her speech properties are typically based on a numerical score, derived from comparing a given test speech sample to previously constructed speaker models. The authentication framework of such conventional techniques are based on a binary hypothesis test, where the result of an authentication is a yes/no answer.

By way of example, assume $s_n$ denotes a discrete time speech sample sequence provided by a system user seeking access to a conversational system. This speech data, along with the user's speaker model $M_i$ (which is selected based on an identity claim i provided by the user), is processed to verify the identity claim. The identity claim itself must belong to an authorized user. More specifically, a score for speaker i may be computed using a real (R) valued function $\rho$ taking as input $s_n$, $M_i$, and possibly computed with respect to the background model(s) (as is understood by those skilled in the art) as follows:

$$\rho(s_n, M_i) \in R. \quad (1)$$

A verification (authentication) process is then performed via a hypothesis test. For example, given an identity claim i in the above example, the competing hypotheses are:

H0: The speech sample $s_n$ was produced by speaker i.

H1: The speech sample $s_n$ was produced by a speaker other than i.

Next, by computing the distribution of scores under the conditions of each hypothesis, the resulting (distribution) functions can be used to determine a decision criterion and predicted error rates. For example, a decision criterion may involve selecting a threshold t in the space of scores and then making the following determination:

If $\rho(s_n, M_i) > t$ then accept H0, else accept H1.

In addition, the predicted error rates may be determined as follows. Assuming $d(\rho|H0)$ and $d(\rho|H1)$ are the probability densities associated with each of the hypotheses, given a threshold t, the probability of false rejection is:

$$\int_{-\infty}^{t} d(\rho|H0) \quad (2)$$

and the probability of false acceptance is:

$$\int_{t}^{+\infty} d(\rho|H1). \quad (3)$$

Authentication techniques that implement the above binary hypothesis test are useful in applications where human-machine interaction is typically short (e.g., a request for specific information such as a bank balance, simple action commands such as starting a voice activated car, etc.) because the authentication process is typically performed once at the beginning of the short dialog session. Indeed, with simple action commands, no further conversation is required. In addition, because of the minimal conversational dialog in theses instances, the system state (or context) does not need to be collected and maintained over the course of an extended interaction.

On the other hand, more sophisticated dialogs, which are typically long in duration, are characterized by the need to store and manage the context and perform actions based on this context. Systems that afford sophisticated conversational dialog should also afford continual and unobtrusive authentication. By way of example, if the system is being used by a speaker who was initially authenticated, and then suddenly the speaker changes, the system should prevent the new speaker from being able to access the same privileges as the prior speaker. This is particularly important in complex conversational systems that afford access to data with a wide range of security classifications. Indeed, the user's identity should be maintained as part of the system state (context), whereby a change in identity of the speaker is a state change that is detected.

Accordingly, a new authentication process is needed for implementation with a conversational system having sophisticated dialogs so as to provide continuous and unobtrusive authentication of the user during the course of the user interaction with the conversational system.

SUMMARY OF THE INVENTION

The present invention is directed to a system and method for providing continuous confidence-based authentication. The present invention may be implemented in an incremental access authentication system for controlling access to secured data having various levels of security. During the course of a conversational session between user and machine, a conversational system comprising a confidence-based authentication system according to the present invention will periodically analyze the input speech of a user interacting with the system to compute a "confidence measure" for the validity of an original identity claim (denoted by i) provided by the user at the commencement of the dialog session. Advantageously, a "confidence measure" computation process according to the present invention is seamlessly integrated into the conversational architecture so that the conversational system tailors the interaction to its confidence in the original identity claim.

In one aspect of the present invention, a method for authenticating a user in a conversational system comprises the steps of: receiving an identity claim from a user; computing a confidence score based on the identity claim using speech input from the user, wherein the confidence score is a measure of confidence in the validity of the identity claim; and providing the user access to secured data based on the computed confidence score. Preferably, the confidence score is based on a linear function of statistical models that characterize the score under a plurality of conditions.

In another aspect of the present invention, the confidence score is maintained as part of the system state (context) along with the original identity claim.

In yet another aspect, the data/resources of one or more secure databases is partitioned into a plurality of data classes. Each of the data classes is assigned a security level (based on the intended application). The security levels are sorted in increasing order and an access map is constructed using the sorted security levels. During a conversational session between user and machine, the computed confidence score will be used to determine the access map and, in turn, the level of data that the user may be allowed to access.

In another aspect of the invention, a range of relevant confidence scores is partitioned into a plurality of regions. Each region comprising the range of confidence scores is assigned to one of the predetermined security levels. When a confidence score is computed, the region containing the computed confidence score is determined and the corresponding security level is identified. This security level is then used to determine the access map.

In yet another aspect, the confidence score is periodically re-computed upon the occurrence of a predetermined event (e.g., user query). This process allows the conversational system to periodically check the confidence level of the original identity claim, so as to detect possible speaker changes, and/or modify the level of secured access provided to the user.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
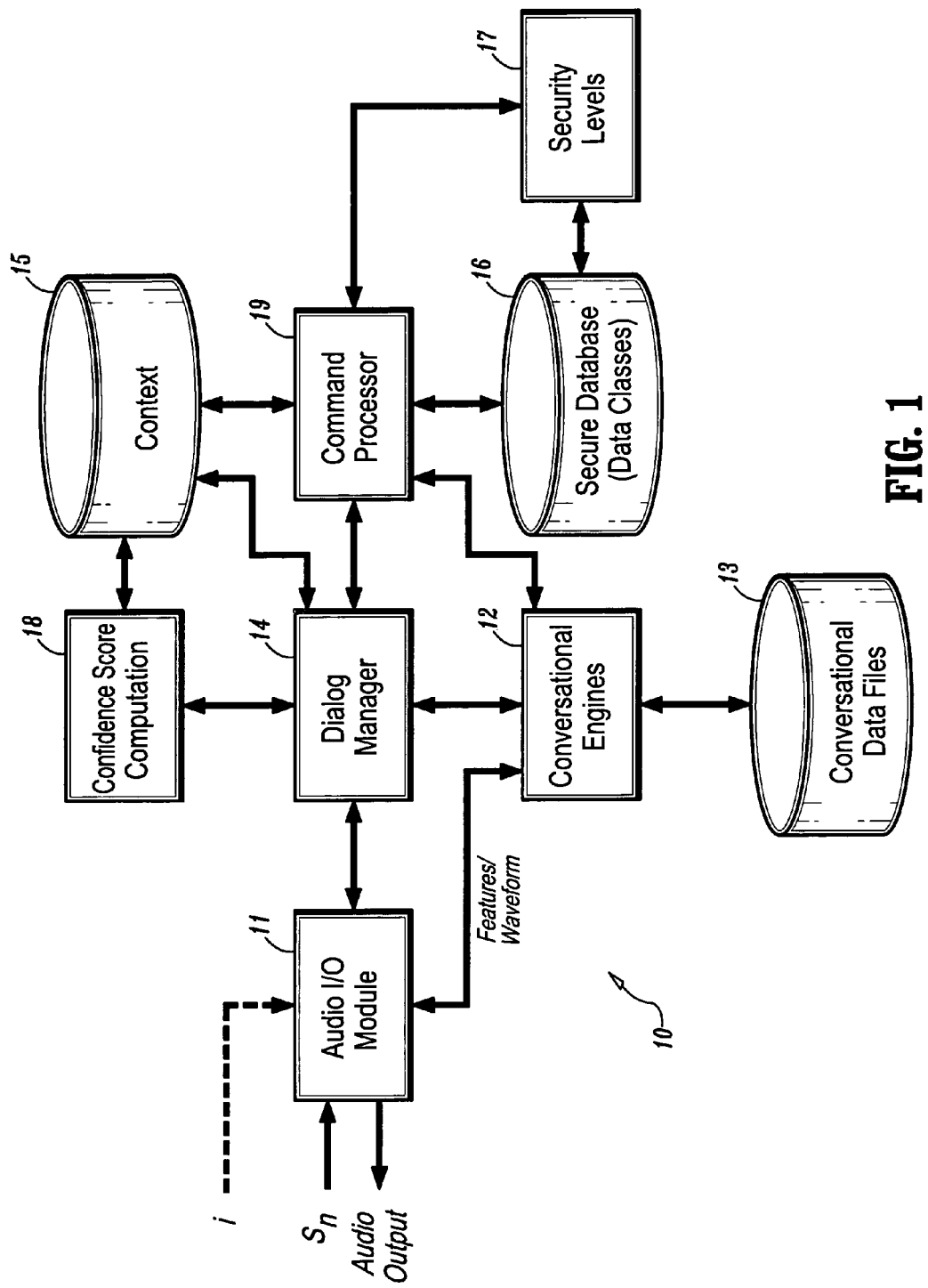
FIG. 1 is a block diagram of a conversational system according to an embodiment of the present invention.

Referring now to FIG. 1, a block diagram depicts a conversational system 10 employing a confidence-based authentication system and method according to an embodiment of the present invention for providing incremental access to data having varying degrees of security classifications. In general, during the course of a conversational session between user and machine, the conversational system 10 periodically analyzes the input speech (denoted $s_n$) of a user interacting with the system 10 to compute a "confidence measure" in the validity of an original identity claim (denoted i) provided by the user at the commencement of the dialog session. Advantageously, a "confidence measure" computation process according to the present invention (described in detail below) is seamlessly integrated into the conversational architecture so that the conversational system 10 tailors the interaction to its confidence in the original identity claim.

The conversational system 10 according to a preferred embodiment comprises an audio I/O (input/output) module 11. The audio I/O module 11 comprises an acoustic front end for capturing input speech, as well as processing the input speech to extract the relevant features using any suitable feature extraction technique known to those skilled in the art. In addition, the audio I/O module 11 may comprise an audio playback system for outputting, e.g., audio files and synthesized speech. The conversational system 10 comprises one or more conversational engines 12 for processing the input speech and generating audio output. The conversational engines 12 may include, for instance, a speech recognition engine, a speaker recognition engine, a TTS (text-to-speech) engine, a NLU (natural language understanding) engine, a NLG (natural language generation) engine, a speech compression/decompression engine, as well as other conversational engines that may be needed for the given application. The conversational engines 12 utilize conversational data files 13 for executing their respective functions (e.g., speech models, speaker models, vocabularies, grammars, language models, parsing and translation/tagging models, synthesis rules, baseforms (pronunciation rules), symbolic languages, etc.).

The conversational system 10 further comprises a dialog manager 14 which, in general, controls the conversational interaction (I/O processing) with the user during a conversational session. More specifically, the dialog manager 14 performs functions such as maintaining, in context store 15, the conversational state or context associated with the given application during a conversational session, as well as allocating conversational engines 12 for specific conversational tasks (e.g., speech recognition of input speech, synthesized speech output via the TTS engine, etc.). A command processor 19, which operates under the control of the dialog manager 14, receives and processes transcribed speech data that is output from, e.g., the speech recognition engine, to execute any allowable speech commands that the command processor 19 recognizes in the transcribed speech. It is to be understood that the allowable commands vary based on the given application.

In addition, the dialog manager 14 controls a user authentication process according to the present invention to provide incremental access to resources/data stored in a secure database 16 (or a plurality of databases). More specifically, the content of database 16 is partitioned into a plurality of classes, with each class being assigned a security level 17. It is to be understood that the selection of the security levels 17 and the partitioning of the content of database 16 is determined a priori by the system developer. Assuming that there are $N_s$ levels of security, the data is partitioned into $N_s$ classes.

By way of example, assume the conversational system 10 comprises an e-mail client, wherein the secure database 16 in this instance is a set of e-mails. Each piece of mail can be assigned a level of security based on characteristics such as confidentiality level, recipient list, subject matter etc. In particular, one method of assigning security levels is to consider the "To:", "Subject:", and "cc:" fields of a typical e-mail header. For example, if addressees representing large groups (e.g., Speech-Group, All, etc.) appear in the "To:" and "cc:" fields, then the e-mail can be assigned a low level of security. If, on the other hand, the "Subject:" field indicates that the e-mail is confidential or private, then a high security level may be assigned. Moreover, assume a list of individual addresses is given in the "To:" and "cc:" fields. Then the system only needs to verify that the user is one of the addressees. (i.e. it needs to have a high enough confidence that the user is one of the addressees.) For any given database, the process of assigning security levels is an integral part of the development of an incremental access authentication system.

In accordance with the present invention, an access map for accessing the data in database 16 is generated by assigning to each of these data classes $N_s$ (or security levels) a range of confidence measures. A method for generating an access map according to one aspect of the present invention is described in detail below with reference to FIG. 3. When a user initiates a dialog with the conversational system 10, the user will provide an identity claim i which is deemed part of the context that is stored in context store 15. At the request of the dialog manager 14, a confidence score computation module 18 will compute a confidence score C, which represents the level of confidence of the system that the user is who he/she claims to be. A preferred process for computing the confidence score C is described in detail below and with reference to FIG. 4.

The confidence score C is then compared with the access map to determine the level of secured data (e.g., e-mails) that may be accessed by the user from the database 16. The dialog manager 14 prevents user access to any data in database 16 that is not made available by the current access map. The confidence score C and/or corresponding access map are deemed part of the context that is maintained in context store 15. As the dialog continues, the speech data is collected and analyzed to periodically compute a new confidence score C based on the original identity claim i. More specifically, the dialog manager 14 will signal the confidence score computation module 18 to compute a confidence score C so that the new confidence level can be checked against the validity of the original identity claim. In this manner, the conversational system 10 can periodically update its confidence level in the original identity claim and detect speaker changes, if any, so as to control the level of access to data in database 16 accordingly. After each such analysis, the context is updated to reflect the new confidence score. Over the course of a dialog session, a sequence of access maps/confidence scores are stored in the context store 15. In this manner, the authentication process is incremental and unobtrusive.

A preferred confidence measure according to an embodiment of the present invention will now be described. It is to be understood that a preferred confidence measure is an extension of the conventional binary hypothesis verification approach (equation (1) and hypothesis H0, H1) discussed above. It is to be appreciated the confidence measure described herein can effectively handle multi-modal distributions, unlike the traditional verification approach. Moreover, the confidence measure does not represent an answer to the binary hypothesis test—instead, it is a continuous measure of confidence in the validity of the authentication claim. A preferred confidence score is based on a linear function of statistical models that characterize the score under a plurality of conditions. More specifically, a preferred confidence measure is defined as follows:

A binary random variable X is defined as follows:

$$P(X=1) = \frac{\int_t^{+\infty} d(\rho|H0)}{\int_t^{+\infty} d(\rho|H0) + \int_t^{+\infty} d(\rho|H1)} \text{ and} \quad (4)$$

$$P(X=0) = \frac{\int_t^{+\infty} d(\rho|H1)}{\int_t^{+\infty} d(\rho|H0) + \int_t^{+\infty} d(\rho|H1)}. \quad (5)$$

As is understood by those skilled in the art, equation (4) is a ratio that represents the "likelihood" that a score above the threshold t indicates the validity of the hypothesis H0 and equation (5) is a ratio that represents the "likelihood" that a score above the threshold t indicates the validity of hypothesis H1.

In one embodiment of the present invention, the access rights decision is based on a confidence measure $C=P(X=1)$. More specifically, when given test data, the corresponding $\rho$ is preferably computed as given by the above equation (1). The computed value $\rho$ is then set as the lower limit t on the above integrals in equations (4) and (5).

Figure 5:
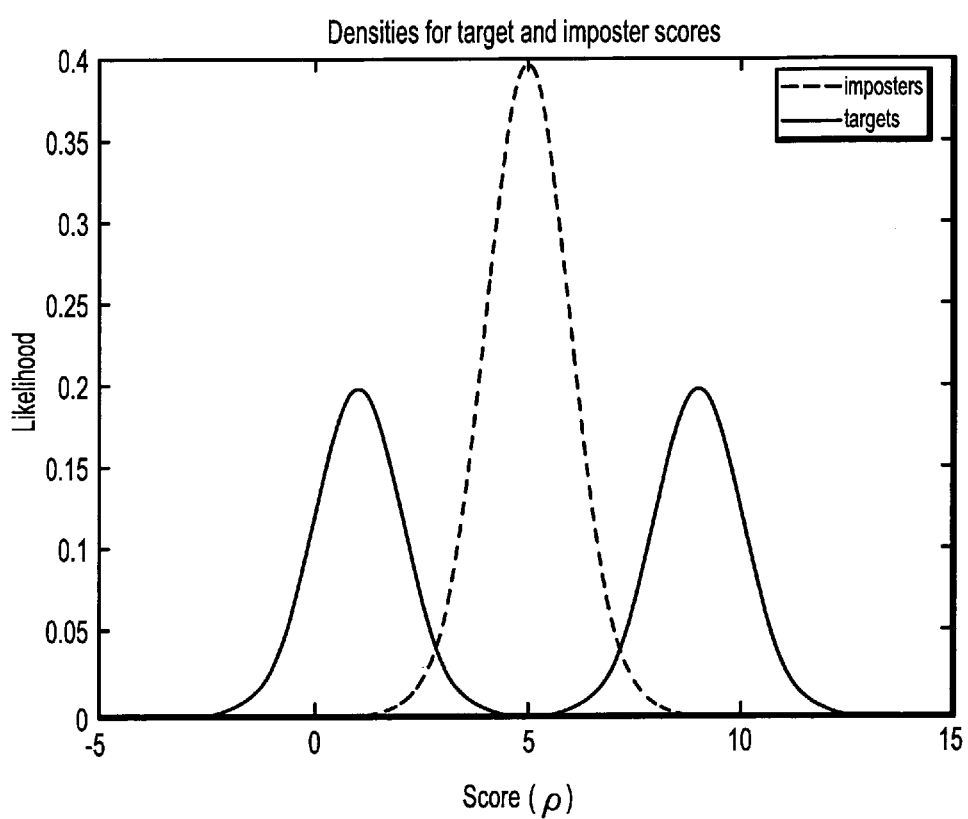
FIG. 5 is an exemplary graphical diagram of probability densities of target and impostor scores for a multi-modal implementation.

In another embodiment of the present invention, in the case of multi-modal distributions where a reject class or accept class or both may comprise multiple distributions (such as illustrated in FIG. 5), an additional binary variable Y is used for computing the confidence score, which is defined as follows:

$$P(Y=1) = \frac{d(\rho|H0)}{d(\rho|H0) + d(\rho|H1)} \text{ and} \quad (6)$$

$$P(Y=0) = \frac{d(\rho|H1)}{d(\rho|H0) + d(\rho|H1)} \quad (7)$$

where $\rho$ is the value given by equation (1). As understood by those skilled in the art, equation (6) is a ratio that represents the "likelihood" that a particular score indicates the validity of hypothesis H0, and equation (7) is a ratio that represents the "likelihood" that a particular score indicates the validity of hypothesis H1. Furthermore, by defining a mixing factor $\lambda$, preferably where $0 \leq \lambda \leq 1$, the confidence measure C may be computed as follows:

$$C=\lambda P(X=1)+(1-\lambda)P(Y=1), \quad (8)$$

where C ∈[0,1] (as discussed below). A preferred process for computing the confidence measure is discussed in more detail below with reference to FIG. 4.

It is to be appreciated that the conversational system 10 may be implemented with any conversational application, device, machine or platform for controlling access to secured data and resources. By way of example, the conversational system 10 may be implemented in an IVR (interactive voice response) system which executes on a remote server and which is accessible by a wireless or conventional telephone. In addition, the conversational system 10 may be implemented in a content server on a computer network (e.g., the Internet, an intranet, an extranet, a LAN (local area network) for providing conversational access to secured data or services. The content server may be accessible via a client device (e.g., a personal computer or a PDA (personal digital assistant)) using any suitable communication protocols known to those skilled in the art for transmitting voice data and otherwise providing appropriate client/server communication. Furthermore, the conversational system may be distributed among the client and one or more servers. Those skilled in the art may readily envision other implementations for a conversational system employing a confidence-based authentication such as the exemplary embodiment described herein.

Figure 2:
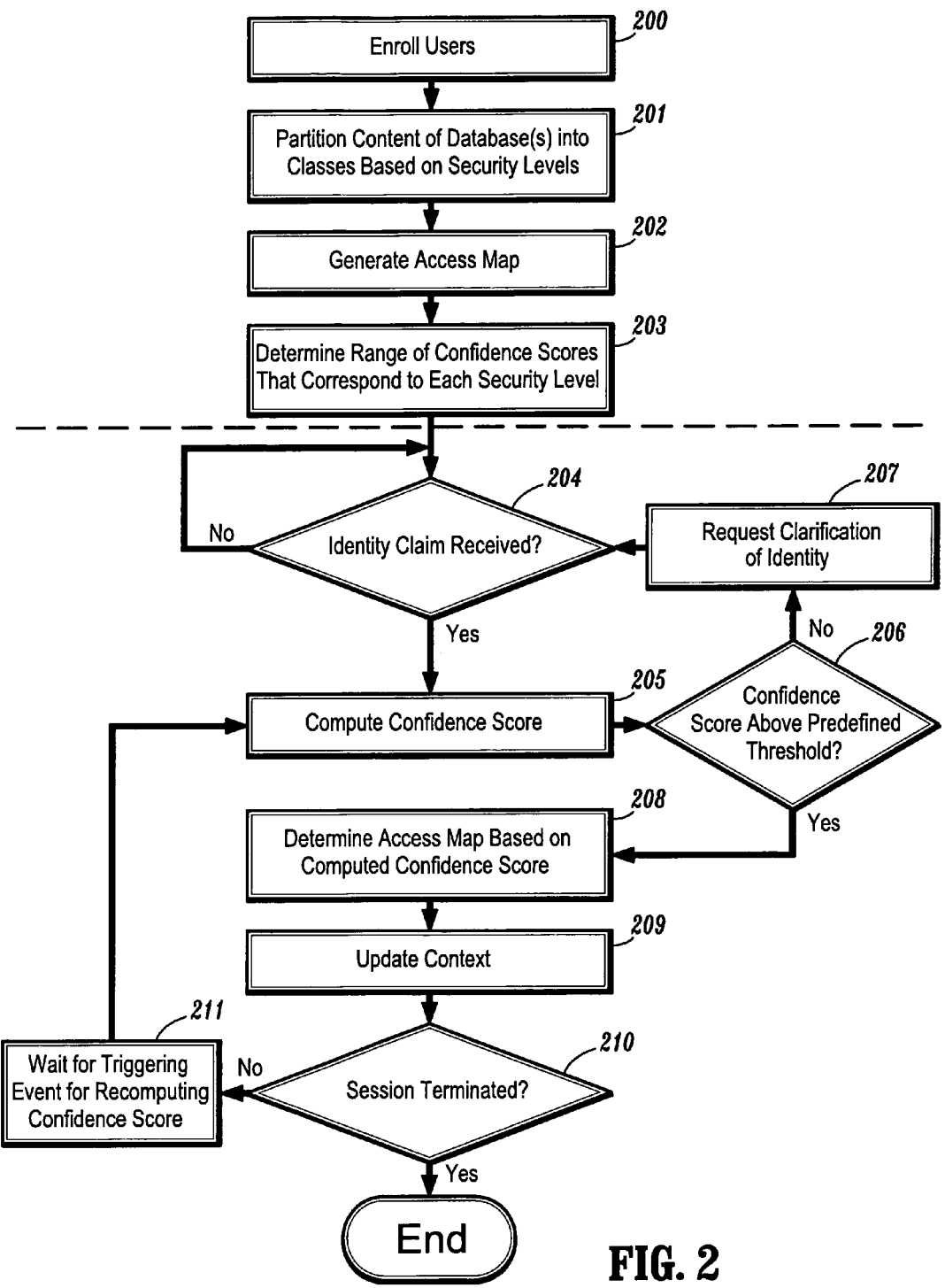
FIG. 2 is a flow diagram of a method for providing user authentication according to one aspect of the present invention.

Referring now to FIG. 2, a flow diagram illustrates a method for providing confidence-based incremental access authentication according to one aspect of the present invention. Initially, one or more system users are enrolled in the system (step 200) using any suitable technique known to those skilled in the art. An enrollment process involves collecting and processing speech samples provided by a given system user to build one or more speaker models (or voice prints) for the user. Let $M_i$ denote the speaker model (or set of speaker models) of the $i^{th}$ enrolled user. These speaker models enable the system to subsequently authenticate the identity of an enrolled speaker (or target speaker) using confidence measures as described herein. Although any suitable technique may be used for building the speaker models, in a preferred embodiment, each speaker model represents a speaker dependent probability density on the space of speech feature vectors, which enables the use of likelihood based scoring for computing a confidence measure in accordance with the present invention. Moreover, depending on the verification technique employed, the system may generate and store a plurality of general models (or background models) that are used to represent the global population. Scores may then be computed with respect to this global model, as its purpose is to serve as a normalization (as is understood by those skilled in the art).

A next step in building an incremental access system involves partitioning all the content in the accessible databases into a plurality of classes based on the security level (step 201). As noted above, the system developer will select these security levels and partition the data as desired. Again, assuming that there are $N_s$ levels of security, all the data should be partitioned into $N_s$ classes.

The next step involves generating an access map (step 202). In one embodiment, the data classes are sorted in the order of increasing security level. Each class is assigned the numerical value of its order in the sorting. An access map is then created which takes as input a number (the security or confidence level), 1 . . . , $N_s$, and returns the set of data available at that level. In one embodiment, the data available at level L also includes the data corresponding to all classes having security levels below level L (i.e., based on the sorting, 1, . . . , L), although other access configurations may be employed.

Figure 3:
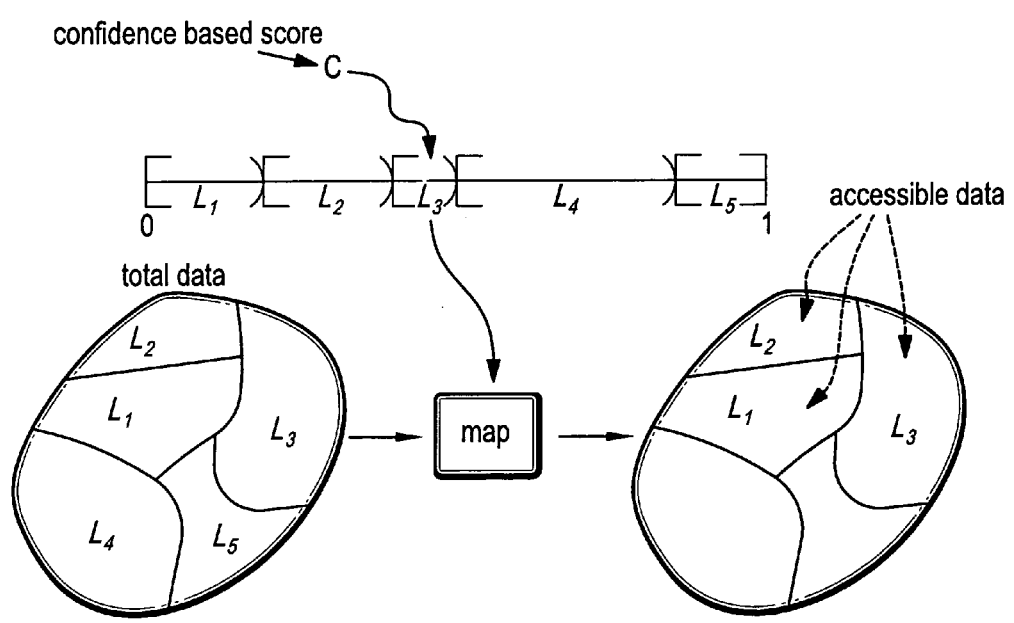
FIG. 3 is a diagram illustrating a line segment partition process and corresponding access map according to an exemplary embodiment of the present invention.

Next, the system developer will determine the range of confidence scores that are assigned to each security level (step 203). The diagram of FIG. 3 illustrates a preferred process for performing this step. In FIG. 3, a line segment [0,1] represents a spectrum of confidence measures C ranging in value from 0 to 1. This line segment is partitioned into $N_s$ non-overlapping regions (denoted, e.g., $L_1, \ldots L_5$). Each region (or partition) indicates the security level for the data available to the user based on the computed confidence score C. In other words, the region of line segment [0,1] in which a computed confidence score C falls into will determine an access map, as defined above.

By way of example as shown in FIG. 3, if a computed confidence score C falls within the $L_3$ region, preferably, the user will be able to access the data assigned in security levels $L_1$ through $L_3$. It is to be understood that FIG. 3 depicts a preferred method in which the confidence measure C ranges in value from 0 to 1, although other ranges of values may be used.

It is to be further understood that steps 200–203 discussed above are initial steps that are performed by the system developer for constructing an incremental access authentication system according to the present invention. It is to be appreciated, however, that such steps may be performed at any time after the system is deployed. For instance, new users may be subsequently enrolled at any time after the system is deployed. In addition, as the system usage is analyzed over time, the access maps and segment partitions can be updated to improve system performance. Indeed, the parameters may be modified at any time to make the system more or less restrictive.

During operation of the system, a user seeking access (e.g., requesting e-mails) will input an identity claim to the system (step 204). An identity claim may be provided in one of various manners, e.g., by entering a password, swiping a card through a card reader, speaking/entering the user's name/user ID, etc. Once the system receives an identity claim (affirmative result in step 204), the system will compute an initial confidence score C to determine the confidence level in the identity claim (step 205).

Figure 4:
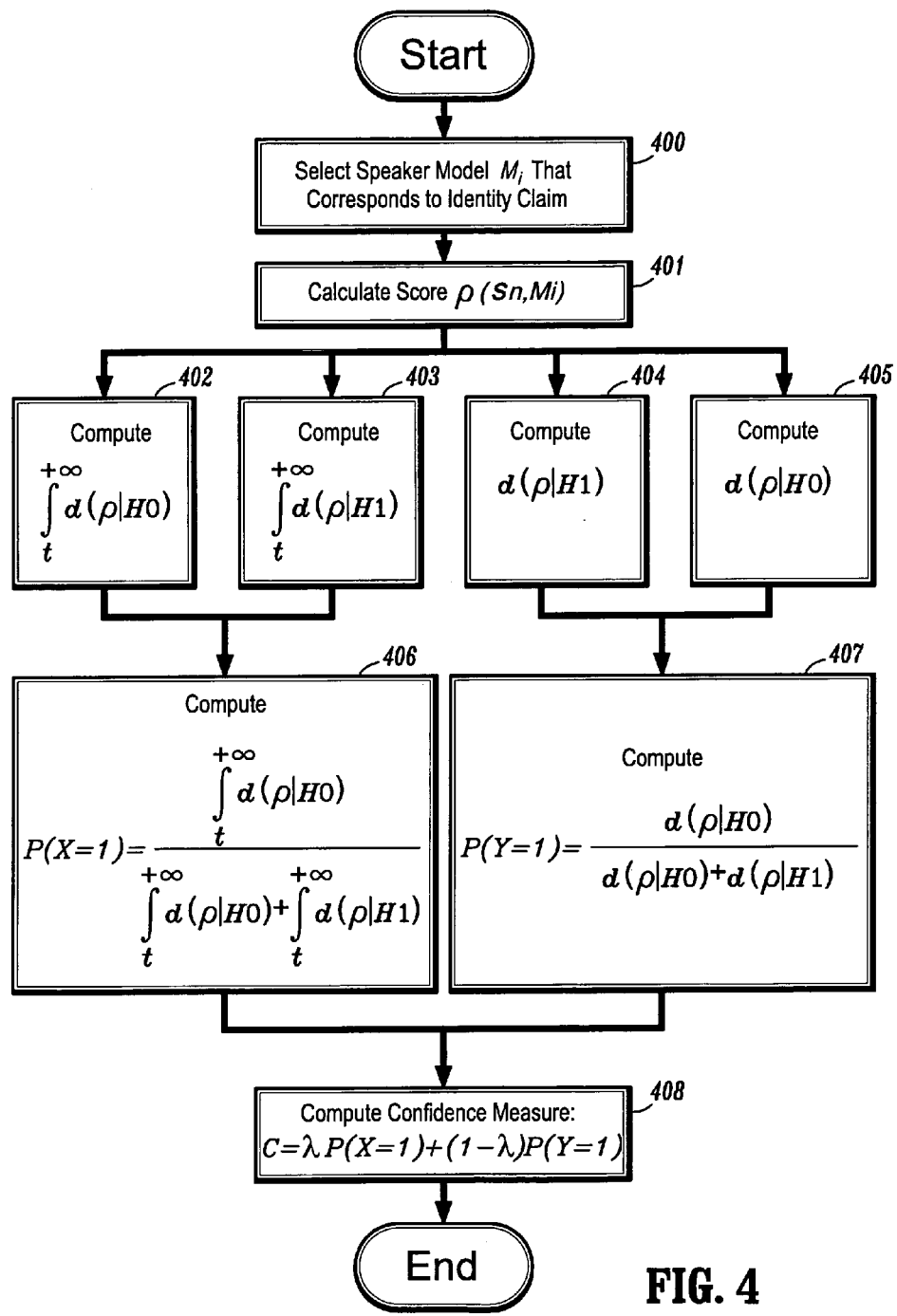
FIG. 4 is a flow diagram of a method for computing a confidence measure according to one aspect of the present invention.

A preferred method for computing the confidence score in accordance with the present invention will now be described with reference to FIG. 4. Initially, the speaker model $M_i$ corresponding to the identity claim i will be identified (step 400). As the user continues to interact with the system, speech data is collected. Once enough speech data has been collected, a score ρ for the speaker will be computed using, e.g., equation (1) above: $\rho(s_n, M_i)$ (step 401). Next, for single mode implementation, the value $$\int_t^{+\infty} d(\rho|H0)$$

is computed (step 402) and the value $$\int_t^{+\infty} d(\rho|H1)$$

is computed (step 403), where the value t for both computations is set to the score ρ (as computed in step 401). The values of the integrals computed in steps 402 and 403 represent the probability that a score ρ is above the threshold t under hypothesis H0 and H1, respectively. These values are then used (in step 406) to compute P(X=1) using the above equation (4).

Furthermore, for multi-modal implementations, the value d(ρ|H1) is computed (step 404) and the value d(ρ|H0) is computed (step 405), and these values are used (in step 407) to compute P(Y=1) using the above equation (6). The values computed in steps 404 and 405 represent the likelihood of the score ρ given hypothesis H1 and H0, respectively. Once P(X=1) and P(Y=1) (if used) are computed, the confidence score C is computed (step 408) using the above equation (8).

Referring back to FIG. 2, once the initial confidence score C is computed, a determination may be made as to whether the confidence score C exceeds some predetermined threshold (step 206). This step may be performed to determine if there is sufficient confidence in the first instance (or at a subsequent time) that the speaker is who he/she claims to be based on the identity claim. The threshold value may be any desired value, e.g., 0. If the confidence score does not exceed the predetermined threshold (negative determination in step 206), the system will prompt the speaker for additional information or speech input so as to clarify the user's claimed identity (step 207). The user can then provide the requested information, and a confidence score will be computed (step 205).

On the other hand, if the confidence score C exceeds the predetermined threshold (affirmative result in step 206), based on the computed confidence score C, the system will utilize the access map (as explained above with reference to FIG. 3) to determine the data (e.g., e-mails) that the user will be able to access from the secured database (step 208). The system state or context is then updated by storing the current confidence measure and/or access map along with the claimed identity i in the context store (step 209).

As the dialog session continues (step 210), the user's speech is continuously analyzed, and the system will re-compute a confidence score C at the occurrence of a triggering event (step 211). The triggering event may be any predetermined event (e.g., receiving a user query, the expiration of a predetermined (periodic) time period, etc.) based on the given application. When the triggering event is detected (step 211), the system will re-compute the confidence score (return to step 205) to check the confidence level in the validity of the original identity claim. For instance, if the new confidence score C falls below the predetermined threshold (step 206), the system may conclude that the speaker is not the system user associated with the original identity claim. In this instance, the system can prompt the speaker to provide a new identity claim, whereby the authentication process described above is repeated to provide the new speaker access to data appropriately. After each such analysis, the context is updated to reflect the new confidence score/access map. In this manner, the present invention provides an authentication process that is incremental and unobtrusive.

Figure 6:
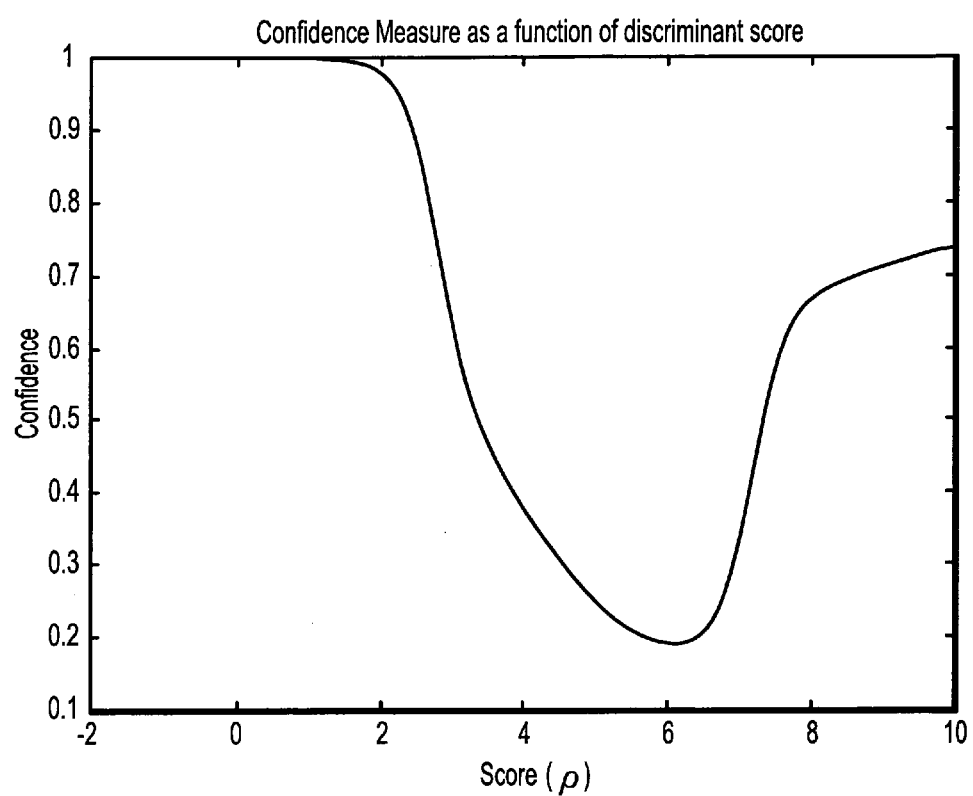
FIG. 6 is an exemplary graphical diagram of the confidence measure based on the probability densities depicted in FIG. 5.

FIG. 5 is an exemplary graphical diagram of probability densities of target and impostor scores for a multi-modal implementation. More specifically, FIG. 5 illustrates probability densities as a function of ρ (equation 1), in which two probability density functions (solid lines) are plotted for a target score and one probability density function (dotted line) is plotted for an impostor score. FIG. 6 is an exemplary graphical diagram of the confidence measure based on the probability densities depicted in FIG. 5 (i.e., the confidence measure (equation (8)) is plotted for the densities of FIG. 5)

It is to be appreciated that the function depicted in FIG. 6 can be used as a guide to determine the practical or natural partitions of the line segment [0,1] (FIG. 3). For instance, the slope of the curve may be used to set breakpoints, as this is an indication of how fast the confidence measure changes as a function of the score. As indicated above, based on usage observations over time, the access maps and line segment partitions may be updated to improve performance. At any time, the parameters can be altered to make the system more or less restrictive.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computer implemented method for authenticating a user in a conversational system, comprising the steps of:
   receiving an identity claim from a user upon commencement of a dialog session;
   computing a confidence score using speech input from the user, wherein the confidence score is a measure of confidence in the validity of the identity claim; and
   providing the user access to secured data having varying levels of security, wherein providing access comprises determining a level of secured data that may be accessed by the user based on the computed confidence score,
   wherein computing a confidence score comprises computing a confidence score upon occurrence of a predetermined event during the dialog session with the user to determine a current measure of confidence in the validity of the identity claim, and changing a level of secured data that may be accessed by the user during the dialog session, if necessary, according to the current measure of confidence in the validity of the identity claim.

2. The computer implemented method of claim 1, further comprising the step of maintaining the confidence score as part of the system state.

3. The computer implemented method of claim 1, further comprising the steps of:
   partitioning the secured data into a plurality of data classes;
   assigning a security level to each of the data classes; and
   constructing an access map based on the security levels for accessing the secured data.

4. The computer implemented method of claim 3, further comprising the steps of:
   selecting a range of confidence scores;
   partitioning the range of confidence scores into a plurality of regions; and
   assigning each region to one of the security levels.

5. The computer implemented method of claim 4, wherein the step of providing the user access to secured data based on the computed confidence score comprises the steps of:
   determining a given region of the plurality of regions which comprises the computed confidence score;
   determining the security level assigned to the given region; and
   accessing secured data using the access map based on the security level assigned to the given region.

6. The computer implemented method of claim 5, wherein the step of accessing secured data using the access map comprises the step of allowing access to secured data that is assigned to the security level of the given region and secured data assigned to at least one security level that is lower than the security level of the given region.

7. The computer implemented method of claim 1, wherein the predetermined event comprises expiration of a predetermined time period during the dialog session.

8. The computer implemented method of claim 1, wherein the predetermined event is a user query for accessing secured data.

9. The computer implemented method of claim 1, wherein the confidence score is based on a linear function of statistical models that characterize the score under a plurality of conditions.

10. The computer implemented method of claim 9, wherein the confidence score comprises one of (1) a first component for considering a single mode implementation and (2) the first component and a second component for considering a multi-modal implementation.

11. The computer implemented method of claim 10, wherein the confidence score comprises a mixing factor for weighting the first and second component in a multi-modal implementation.

12. A program storage device readable by a machine, tangibly embodying a program of instructions executable by the machine to perform method steps for authenticating a user in a conversational system, the method comprising the steps of:
receiving an identity claim from a user upon commencement of a dialog session;
computing a confidence score using speech input from the user, wherein the confidence score is a measure of confidence in the validity of the identity claim; and
providing the user access to secured data having varying levels of security, wherein providing access comprises determining a level of secured data that may be accessed by the user based on the computed confidence score,
wherein computing a confidence score comprises computing a confidence score upon occurrence of a predetermined event during the dialog session with the user to determine a current measure of confidence in the validity of the identity claim, and changing a level of secured data that may be accessed by the user during the dialog session, if necessary, according to the current measure of confidence in the validity of the identity claim.

13. The program storage device of claim 12, further comprising instructions for performing the step of maintaining the confidence score as part of the system state.

14. The program storage device of claim 12, further comprising instructions for performing the steps of:
partitioning the secured data into a plurality of data classes;
assigning a security level to each of the data classes; and
constructing an access map based on the security levels for accessing the secured data.

15. The program storage device of claim 14, further comprising instructions for performing the steps of:
selecting a range of confidence scores;
partitioning the range of confidence scores into a plurality of regions; and
assigning each region to one of the security levels.

16. The program storage device of claim 15, wherein the instructions for performing the step of providing the user access to secured data based on the computed confidence score comprise instructions for performing the steps of:
determining a given region of the plurality of regions which comprises the computed confidence score;
determining the security level assigned to the given region; and
accessing secured data using the access map based on the security level assigned to the given region.

17. The program storage device of claim 16, wherein the instructions for performing the step of accessing secured data using the access map comprise instructions for performing the step of allowing access to secured data that is assigned to the security level of the given region and secured data assigned to at least one security level that is lower than the security level of the given region.

18. The program storage device of claim 12, wherein the predetermined event comprises expiration of a predetermined time period during the dialog session.

19. The program storage device of claim 12, wherein the predetermined event is a user query for accessing secured data.

20. The program storage device of claim 12, wherein the confidence score is based on a linear function of statistical models that characterize the score under a plurality of conditions.

21. The program storage device of claim 20, wherein the confidence score comprises one of (1) a first component for considering a single mode implementation and (2) the first component and a second component for considering multi-modal implementation.

22. The program storage device of claim 21, wherein the confidence score comprises a mixing factor for weighting the first and second component in a multi-modal implementation.

23. A computer system to control incremental access authentication to secured data, the computer systems comprising:
a database that is partitioned into a plurality of data classes, wherein each data class is assigned a range of confidence scores based on a security level of the data class;
a computation module that computes a confidence score using speech input from a user, wherein the confidence score is a measure of confidence in the validity of an identity claim input by the user upon commencement of a dialog session, wherein the computation module computes a confidence score upon occurrence of a predetermined event during the dialog session with the user to determine a current measure of confidence in the validity of the identity claim; and
a dialog manager for controlling access to data in the database during the dialog session, wherein a level of access to the data classes is limited to a data class in which a current confidence score meets or exceeds a confidence score assigned to that data class, and wherein the level of access to the data classes can be changed during the dialog session, if necessary, according to the current measure of confidence in the validity of the identity claim.

24. The system of claim 23, further comprising an access map for mapping each data class with the corresponding range of confidence scores, wherein the access map is utilized by the dialog manager to provide access to data based on the current confidence score.

25. The system of claim 23, further comprising means for maintaining the current confidence score as part of the system state.

26. The system of claim 23, wherein the confidence score is based on a linear function of statistical models that characterize the score under a plurality of conditions.

27. The system of claim 26, wherein the confidence score comprises one of (1) a first component for considering a single mode implementation and (2) the first component and a second component for considering a multi-modal implementation.

28. The system of claim 27, wherein the confidence score comprises a mixing factor for weighting the first and second component in a multi-modal implementation.

* * * * *